United States Patent [19]

Noguchi et al.

[11] 4,249,503
[45] Feb. 10, 1981

[54] EXHAUST GAS RECIRCULATION FOR ENGINE

[75] Inventors: Takeshi Noguchi, Niiza; Hiroyuki Nishimura, Kounosu; Takashi Umemoto, Niiza, all of Japan

[73] Assignee: Honda Giken Kogyo Kabushiki Kaisha, Tokyo, Japan

[21] Appl. No.: 70,026

[22] Filed: Aug. 27, 1979

[30] Foreign Application Priority Data

Sep. 7, 1978 [JP] Japan ................. 53/109066

[51] Int. Cl.³ ................... F02B 47/08; F02M 25/06
[52] U.S. Cl. ......................................... 123/568
[58] Field of Search ................. 123/119 A, 119 F

[56] References Cited

U.S. PATENT DOCUMENTS

| 3,739,797 | 6/1973 | Caldwell | 123/119 A X |
| 3,779,222 | 12/1973 | Lorenz | 123/119 A |
| 3,818,880 | 6/1974 | Dawson | 123/119 A |
| 3,884,200 | 5/1975 | Caldwell | 123/119 A |
| 3,915,136 | 10/1975 | Caldwell | 123/119 A |
| 3,970,061 | 7/1976 | Caldwell | 123/119 A |
| 4,033,308 | 7/1977 | Hayashi et al. | 123/119 A |

FOREIGN PATENT DOCUMENTS

| 1486093 | 9/1977 | United Kingdom | 123/119 A |
| 1486651 | 9/1977 | United Kingdom | 123/119 A |

*Primary Examiner*—Wendell E. Burns
*Attorney, Agent, or Firm*—Lyon & Lyon

[57] ABSTRACT

An exhaust gas recirculation system for an internal combustion engine employs an exhaust gas recirculation control valve in a passageway connecting the engine exhaust passage to the engine intake passage downstream from the throttle valve. The intake passage also provides a choke valve and a carburetor venturi section between the valves. An air conduit having an air control valve therein connects the intake passage between the throttle valve and the choke valve to the intake passage downstream from the throttle valve. Vacuum responsive actuators are provided for each of the control valves and they are operated by vacuum pressure regulated by a regulating valve, which is itself responsive to differential pressure between vacuum intensity in the intake passage upstream from said throttle valve and modified atmospheric pressure. The modified atmospheric pressure is obtained downstream of a restriction in the air conduit. Closing of the choke valve on a cold start of the engine causes high vacuum intake to the air conduit, reducing the exhaust gas recirculation through the exhaust gas recirculation control valve.

1 Claim, 1 Drawing Figure

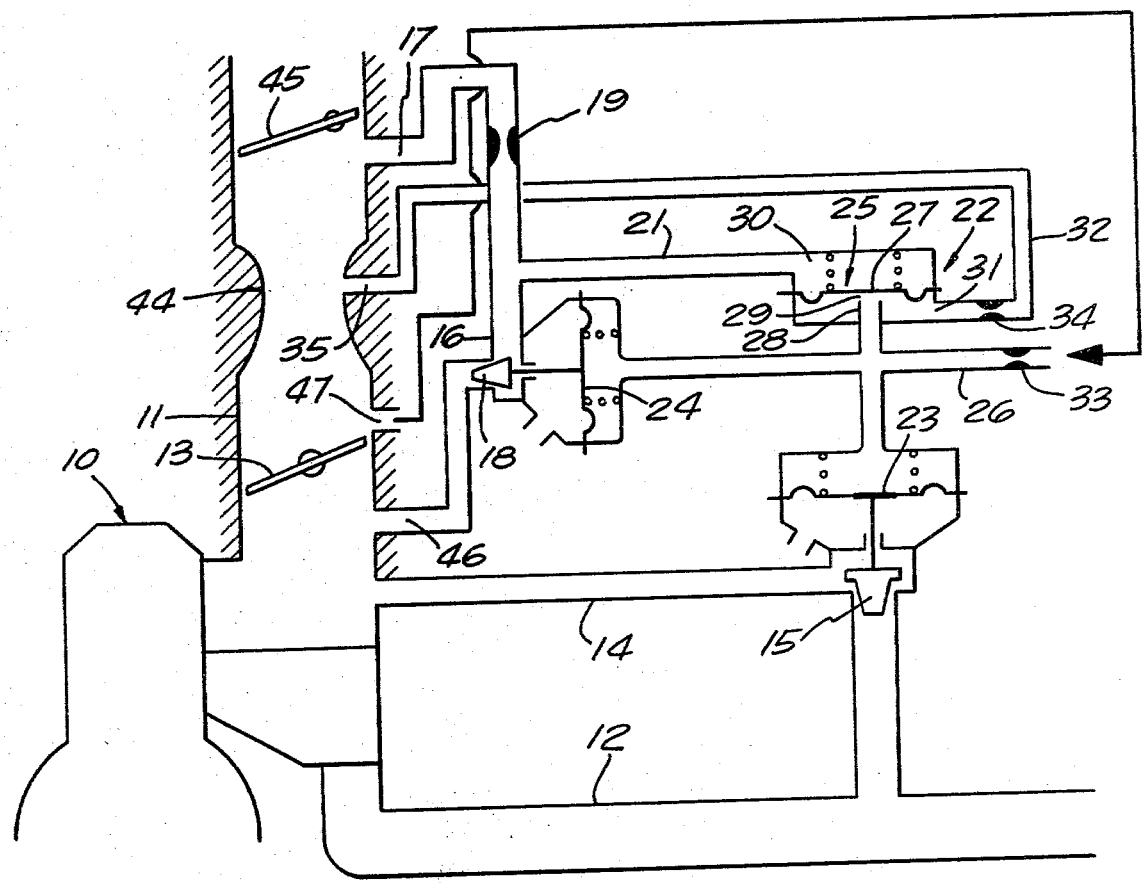

EXHAUST GAS RECIRCULATION FOR ENGINE

This application is related to co-pending an co-assigned U.S. Pat. application Ser. No. 9,370 filed Feb. 5, 1979 by Hiroyuke Nishimura, which is incorporated herein by this reference.

This invention relates to exhaust gas recirculation apparatus for internal combustion engines and is particularly directed to an improved control system for such apparatus.

It is desirable to re-circulate exhaust gases to the engine intake passage substantially in proportion to intake flow of air to the engine. This is accomplished by the invention stated in the foregoing U.S. patent application.

It also is desirable to reduce the rate of recirculation on cold start of engine when the choke valve in the intake passage is tending to closure.

This is accomplished in accordance with the invention by providing an exhaust gas recirculation control valve in a passageway connecting the engine exhaust passage to the engine intake passage downstream from the throttle valve. The intake passage also provides a choke valve and a carburetor venturi section between the choke and the throttle valves. An air conduit having an air control valve therein connects the intake passage between the choke valve and the carburetor venturi section to the engine intake passage downstream from the throttle valve. A regulating valve controls the operation of the control valves, and the regulating valve is responsive to differential pressure between the vacuum intensity in the air conduit downstream of a restriction therein on the one hand and the vacuum intensity at the carburetor venturi section on the other hand. The conduits connecting the intake passage between the throttle and choke valves with the control and regulating valves have restrictions in them.

Other and more detailed objects and advantages will appear hereinafter.

In the drawing:

The drawing is a schematic view showing a preferred embodiment of this invention.

Referring to the drawing, the engine 10 has an intake passage 11 for an air-fuel mixture, and a passage 12 for exhaust gases. A throttle valve 13 is provided in the intake passage 11. A passageway 14 connects the exhaust passage 12 to the intake passage 11 at a location downstream from the throttle valve 13, for recirculating exhaust gases into said engine 10. An exhaust recirculation control valve 15 is positioned in the passageway 14. A carburetor venturi section 44 is provided in the intake passage 11 upstream of the throttle valve 13, and upstream of section 44 there is a choke valve 45.

An air conduit 16 is connected to said intake passage 11 at a location downstream from said throttle valve 13 and has an opening 17 between the carbuetor venturi section 44 and the choke valve 45. An air control valve 18 is mounted in said air conduit 16 and its outlet 46 is into the intake passage 11 downstream of the throttle valve 13. A restriction 19 is placed in the air conduit 16 at a location between the air control valve 18 and the opening 17. A branch conduit 21 is connected to the air conduit 16 downstream with respect to said restriction 19, and a regulating valve 22 is positioned in said branch conduit 21. Each of the control valves 15 and 18 and regulating valve 22 is provided with a vacuum responsive actuator 23, 24, and 25, respectively. Each of these actuators is connected to a control pipe system 26, which is in turn connected to the intake passage 11 at a second vacuum outlet 47 in the vicinity of the throttle valve 13 above the idle position thereof.

The vacuum responsive actuator 25 of the regulating valve 22 is a movable diaphragm having a central non-flexible portion 27. An open ended tube 28 forming a part of the control pipe system 26 is closed and opened by contact with the central portion 27 of the diaphragm member 25. A variable opening 29 is thus formed between the open ended tube 28 and the central portion 27 of the diaphragm member 25. The chamber 30 above the diaphragm member 25 of the regulating valve 22 is subjected to vacuum pressure in the branch conduit 21. The chamber 31 below the diaphragm member 25 is connected to a vacuum line 32 which in turn is connected to the intake passage 11 upstream from the throttle valve 13 in the carburetor venturi section 44. A restriction 33 is placed in the control pipe system 26 upstream of the regulating valve 22, the exhaust gas recirculation control valve 15, and the air control valve 18, the restriction being before the pipe 26 branches out to the said valves. Another restriction 34 is placed in the vacuum line 32 between the regulating valve 22 and a first vacuum outlet 35 to the carburetor venturi section 44.

In operation, the operating vacuum generated at the second vacuum outlet 47 intake passage 11 acts on the vacuum responsive actuators 23 and 24 to open the exhaust gas recirculation control valve 15 and the air control valve 18. Exhaust gases from the exhaust passage 12 are then circulated back to the intake passage 11. The vacuum intensity in the air conduit 16 between the air control valve 18 and the orifice 19 acts on the regulating valve 22 to cause the central portion 27 of the diaphragm 25 to lift away from the valve prot 29. Also the vacuum intensity in the first vacuum outlet 35 introduced into the second chamber 31 through the tube 32 acts on the regulating valve 22 to cause the diaphragm 25 to close the valve port 29. Thus, the action of the regulating valve 22 is regulated by means of both vacuum intensities in the air conduit 16 between the air control valve 18 and the orifice 19 and in the first vacuum outlet 35 in the venturi portion 44. As the vacuum intensity at the first vacuum outlet 35 increases, the regulating valve 22 closes and acts to raise the vacuum pressure in the vacuum responsive actuators 23 and 24, with the result that the rate of flow of exhaust gas circulation also increases.

From the foregoing description, it will be understood that the operating vacuum from the intake passage acting on a control valve is regulated by a regulating valve placed in a passageway connecting the intake passage to atmosphere. The regulating valve responds in proportion to the engine load and therefore the control of introduction of gas is accomplished in a direct manner. The exhaust gas recirculation control valve and the air control valve operate synchronously with each other so that by measuring the rate of flow through the orifice leading to atmosphere and selecting the flow characteristics of the air control valve on the basis thereof, various rates of the additional gas flow introduced into an engine can be established.

In accordance with this invention, as the air conduit 16 is connected to the intake passage 11 through the opening 17 downstream of the choke valve 45, on a cold start of the engine 10, the choke valve 45 is closed and relatively high vacuum intakes occur through opening 17 and through opening 46 located downstream from the throttle valve 13, and these act through the branch conduit 21 to cause a high vacuum in chamber 30 of the regulating valve 22. This causes the central portion 27 of the diaphragm 25 to lift from the opening 28 and increase the leak rate, and consequently reduces exhaust gas recirculation through the valve 15 which is urged toward closure. Gradual opening of choke valve 45 decreases the vacuum in the conduit 16 and branch conduit 21, and correspondingly the vacuum in chamber 30 of valve 22 decreases, consequently decreasing the leak through opening 28 and increasing the opening of valve 15. This increases exhaust gas recirculation. This control of gas recirculation is thus affected substantially automatically by varying the vacuum intake to the opening 17.

Having fully described our invention, it is to be understood that we are not to be limited to the details herein set forth but that our invention is of the full scope of the appended claims.

We claim:

1. In an internal combustion engine having an intake passage for delivering an air-fuel mixture into the engine, a throttle valve in the intake passage, a choke valve in the intake passage, and an exhaust passage for carrying exhaust gases from the engine, the improvement comprising, in combination: a passageway connecting the exhaust passage to the intake passage downstream from the throttle valve for recirculating exhaust gases into said engine, an exhaust gas recirculation control valve in said passageway, an air conduit connecting said intake passage downstream from said throttle to the intake passage downstream of the choke valve, an air control valve in said air conduit, said air conduit having a restriction device located between its upper opening and said air control valve, a branch conduit connected to said air conduit between said restriction device and air control valve, a regulating valve in said branch conduit, each of said two control valves and said regulating valve having a vacuum responsive actuator, a vacuum line connected to said intake passage upstream from said throttle valve, said regulating valve responsive to differential pressure between vacuum pressure in said vacuum line and vacuum pressure in said air conduit, a control pipe system connecting said vacuum responsive actuators to said intake passage near said throttle valve, means whereby said regulating valve acts through said control pipe system to act upon vacuum responsive actuators for said control valves.

* * * * *

UNITED STATES PATENT AND TRADEMARK OFFICE
CERTIFICATE OF CORRECTION

PATENT NO. : 4,249,503
DATED : February 10, 1981
INVENTOR(S) : Takeshi Noguchi et al It is certified that error appears in the above—identified patent and that said Letters Patent are hereby corrected as shown below:

Column 1, line 57, correct spelling of "carburetor".

Column 2, line 28, after numeral "47" insert --in--.

Column 2, line 36, correct spelling of "port".

Column 4, line 7, after "throttle" insert --valve--.

Signed and Sealed this

Twenty-eighth Day of April 1981

[SEAL]

Attest:

RENE D. TEGTMEYER

Attesting Officer     Acting Commissioner of Patents and Trademarks